United States Patent [19]

Hermann

[11] Patent Number: 4,635,966
[45] Date of Patent: Jan. 13, 1987

[54] HOSE CONNECTOR

[75] Inventor: John T. Hermann, Livonia, Mich.

[73] Assignee: Chrysler Motors Corporation, Highland Park, Mich.

[21] Appl. No.: 778,102

[22] Filed: Sep. 20, 1985

[51] Int. Cl.[4] ............................................. F16L 33/00
[52] U.S. Cl. .......................................... 285/3; 285/23; 285/242; 285/244; 285/321; 403/12
[58] Field of Search ................. 285/3, 4, 23, 242, 243, 285/244, 307, 308, 321, 39; 403/12

[56] References Cited

U.S. PATENT DOCUMENTS

| 1,486,421 | 3/1924 | Dyer | 285/243 |
| 2,950,132 | 8/1960 | Kocsuta | 285/321 |
| 4,163,573 | 8/1979 | Yano | 285/174 |
| 4,565,392 | 1/1986 | Vyse | 403/12 |

FOREIGN PATENT DOCUMENTS

| 1051586 | 2/1959 | Fed. Rep. of Germany | 285/244 |
| 1962884 | 7/1970 | Fed. Rep. of Germany | 285/308 |
| 2422096 | 12/1979 | France | 285/3 |

Primary Examiner—Richard J. Scanlan, Jr.
Assistant Examiner—Anthony Knight
Attorney, Agent, or Firm—Kenneth H. MacLean, Jr.

[57] ABSTRACT

A composite connector assembly for easily and quickly making a connection between a flexible hose and an inlet fitting such as on a heat exchanger. The connector includes an elongated nipple-shaped fitting having an enlarged bead on its free end over which the hose end is extended during a connection. A cylindrical housing encircles the fitting and supports a radially outwardly distorted snap ring and associated spacer device maintaining the distortion so that the end of the hose can pass through the ring's center as it extends over and along a central body portion of the fitting. The housing includes a reduced diameter portion to engage the distorted snap ring to limit axial movement thereof as the hose is pushed over the body portion of the fitting. Resultant engagement between the axially inserted hose end and the parts of the snap ring spacer cause disengagement of the snap ring spacer from the snap ring allowing it to spring radially inward about the hose.

3 Claims, 8 Drawing Figures

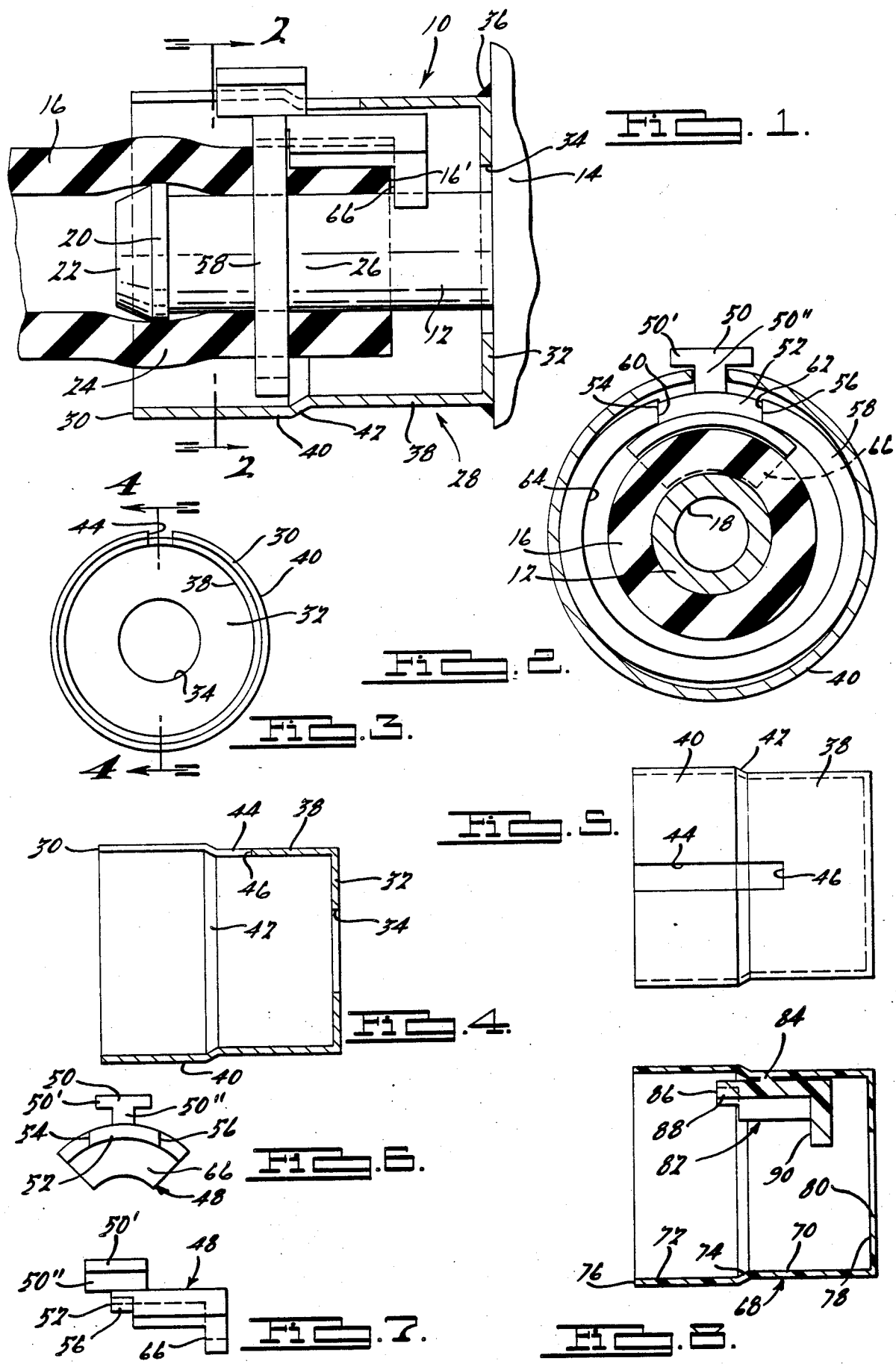

HOSE CONNECTOR

BACKGROUND AND SUMMARY OF THE INVENTION

There have been many prior attempts to provide simple connecting means between flexible elastomeric hoses and inlet fittings of heat exchangers. In vehicles, many heat exchangers are used and there is a need to attach elastomeric hoses thereto. Examples include: the connection of heater hoses to the heater cores for warming the passenger compartment; the connection of radiator hoses to the radiator; and the connection of oil hoses extending from the automatic transmission to an oil cooler typically located within a radiator coolant tank. Currently, the connection of hoses to inlet and outlet fittings is made by tightening a clamp around the outer surface of the hose. The use of clamps has been successful, but is costly in that excess assembly time is required and often clamps are lost or separated from the associated hose. Also, there are many configurations where it is difficult to reach the space where the clamp is to be tightened. The use of front wheel drives in modern vehicles has lessened the space available in the engine compartment and between components.

Another method which has been utilized to attach elastomeric hoses to fittings is the pre-assembly formation of metal end fittings on the hose by mechanical swaging or crimping operations. These metal fitted hoses are costly and have to be custom made for a particular application on the vehicle. Also, they may require greater space than the subject push-on hoses without such metal fittings. Also, they are not easily repairable in the event that a leak is uncovered.

From the foregoing discussion, it is apparent that it would be desirable to have a push-on type hose connector which is a self-contained composite assembly and does not require the addition of any other part or action other than the insertion of a hose therein. There are several push-on type hose connectors that have been tried in the past. Some of these designs have been reasonably effective to seal hoses to fittings, but have involved either a large number of costly parts or require an excess of assembly time.

An example of the above described hose connector is found in U.S. Pat. No. 4,163,573. This patent uses a cylindrical housing with an interior aperture supporting an O-ring. The hose is inserted into the aperture whereby the O-ring contacts the outer surface of the hose to prevent leakage. The hose is axially held within the housing by means of a gripping ring which is axially biased against the inclined surface of an incline ring. This produces a radial gripping action on the hose to prevent disconnection.

The subject invention utilizes the conventional and proven nipple concept of connecting the hose to a fluid passage. Specifically, the connector has an elongated nipple-shaped member over which the hose slips. A snap or clamp ring is automatically applied about the hose and about a cylindrical body portion of the nipple-shaped member as the hose end is inserted into the connector. The hose is prevented from being disconnected by the constrictive force of the clamp ring and an interference with a radial expansion of the hose produced by an enlarged bead on the end of the nipple. The present invention has a cylindrical housing which supports a radially expanded snap ring and spacer mechanism therefor to maintain the snap ring in a radially expanded condition. As the hose is inserted over the bead, it expands and then contracts about the smaller main body portion of the fitting. The hose also slips through the expanded central opening of the snap ring which encircles the main body portion of the fitting. Further insertion of the hose onto the fitting axially moves the snap ring spacer. However, the snap ring engages limiting means of the cylinder to prevent axial movement thereof. Eventually, sufficient axial movement of the spacer allows the snap ring to relax in a radial direction thereby clamping about the central body portion of the fitting and the hose end. Thus, the clamping ring securely holds the hose against this central body portion.

The aforementioned invention is a simple and efficient connecting means for a hose to a fitting. The connector is self contained and also involves few parts. No additional parts are required of an assembler and only an insertion of a hose end onto the connector is necessary.

Other advantageous features of the invention will be readily apparent from a reading of a Detailed Description of a Preferred Embodiment as found in the following drawings.

IN THE DRAWINGS

FIG. 1 is a sectioned elevational view of the connector and a hose attached thereto prior to release of the snap ring;

FIG. 2 is an end sectioned view of the connector with the hose taken along section line 2—2 in FIG. 1 and looking in the direction of the arrows;

FIG. 3 is an end view of just the housing shown in FIG. 1;

FIG. 4 is a sectioned elevational view of the housing shown in FIG. 3 taken along section 4—4 and looking in the direction of the arrows;

FIG. 5 is a planar view of the housing shown in FIG. 3;

FIG. 6 is an end view of just the snap ring spacer member shown in FIGS. 1 and 2;

FIG. 7 is a side view of the spacer member shown in FIGS. 1 and 2; and

FIG. 8 is a modification in the housing and spacer mechanism previously illustrated.

DETAILED DESCRIPTION OF THE PREFERRED EMBODIMENT

In FIGS. 1 and 2 of the drawings, a hose connector 10 is illustrated. The connector 10 includes an elongated nipple shaped fitting 12 which extends from the wall means 14 of a heat exchange tank or the like, such as the heater core of a vehicle. The fitting 12 includes an axially extending fluid passage 18 best shown in FIG. 2 for the transmission of fluid between the hose 16 and the interior of the tank 14. The elongated nipple 12 includes an enlarged diameter free end or beaded portion 20 with an inclined front surface 22 to facilitate the insertion of hose end 16 over the bead and the fitting. The bead 20 produces limited outward radial expansion of the hose 16 as shown at 24. After slipping past the bead 20, the hose contracts to conform to the lesser diameter central portion 26 of the fitting 12.

A generally cylindrical housing member 28 extends about the nipple shaped fitting 12 and has an open end 30 for insertion of the hose 16. Housing 28 has an opposite walled end 32. The walled end 32 has an aperture 34 through which fitting 12 extends and is supported on the tank 14 by a convenient fastening means such as braze 36. The cylinder 28 has a smaller diameter cylindrical portion 38 adjacent the walled end 32 and a larger diameter portion 40 adjacent the open end 30. The portions 38 and 40 are integrally connected by an inclined wall portion 42. For even more details of the configuration of the housing, reference is made to FIGS. 3-5.

In the FIGS. 3-5, an axially extending slot 44 is illustrated from the open end 30 through the larger diameter cylinder 40 and partially through the smaller diameter cylinder 38. The slot 44 terminates at an end surface 46 in the smaller diameter cylinder 38. The purpose of slot 44 is to support a spacer assembly 48 as shown in FIGS. 6 and 7. Specifically, the spacer assembly 48 includes a T-shaped support or flange 50, shown in FIG. 6. The flange 50 has a wide portion 50' adapted to overlie the outer surface of the housing 28. A connecting portion 50" extends through the slot 44 and is integrally connected to a main body of the spacer assembly 48.

The main body of the spacer 48 is best shown in FIGS. 6 and 7 and includes a small segment 52 of a cylinder as defined between side wall surfaces 54 and 56. With reference to FIGS. 1 and 2, it can be understood that the surfaces 54 and 56 are utilized to engage and support a snap ring 58 by interaction with the end surfaces 60 and 62 of the snap ring 58. Thus, surfaces 54 and 56 of segment body 52 hold the ring 58 in a radially outwardly distorted or expanded condition. The resultant generally elliptical inner curved configuration 64 is radially spaced outward sufficiently from the outer surface of the hose 16 to readily permit insertion of the hose end through and past the snap ring 58.

Referring again to FIGS. 6 and 7, it can be understood that the spacer member 48 also includes a radially inwardly contact surface 66 which is engaged by the end of the hose 16 as the hose moves along and over the fitting 12. Referring back to FIGS. 1 and 2, it can be seen that the surface 66 is engaged by end 16' of the hose 16. Movement of hose 16 to the right in FIG. 1 causes the spacer assembly 48 and its supporting T-shaped connector 50 to move to the right in the slot 44. However, snap ring 58 is prevented from moving to the right of its position in FIG. 1 due to its contact with the inclined or reduced diameter surface 42 between cylinder portions 38 and 40. Thus, snap ring 58 remains in the axial position shown in FIG. 1 as the hose end and the spacer 58 move to the right. When the spacer 58 moves sufficiently to disengage the ends 60 and 62 of the snap ring from the surfaces 54 and 56, the snap ring 58 radially contracts with sufficient clamping force to hold the hose 16 against the mid-portion 26 of the nipple shaped fitting 12. In this condition, further movement of hose 16 on the fitting will become more difficult and the hose installer will know that the snap ring has engaged the hose. There also should be a noticeable "feel" or vibration produced when the snap ring engages the hose. Resultantly, leftward disconnecting movement of the hose will also be resisted by the contractive force of snap ring 58 on the hose, particularly when near the enlarged diameter bead portion 20.

In FIG. 8, a modification of the connector assembly shown in FIGS. 1-7 is illustrated. The modification discloses a one piece cylindrical housing and spacer assembly. Specifically, the cylindrical housing 68 may be of readily moldable material such as plastic. As in the aforedescribed embodiment, housing 68 includes a smaller diameter portion 70, a larger diameter portion 72 and an intermediate inclined portion 74. The housing 68 defines an open end 76 and a walled end 78 with aperture 80 therethrough. The spacer assembly 82 is similar to the spacer assembly shown in FIGS. 6 and 7, but without the T-shaped connector 50. Likewise, the housing 68 does not include a slot 44 as shown in FIGS. 3-5. Spacer assembly 82 is integrally attached to the inner wall of housing 68 by means of a tab portion 84 which is of minimal dimension so as to facilitate readily breaking the connection between assembly 68 and 82 when the hose is moved over the fitting 12 shown in FIG. 1. The spacer assembly includes the segment portion 86 with side contact surfaces 88 (only one of which is shown in FIG. 8). Surfaces 88 in the embodiment of FIG. 8 correspond to surfaces 54 and 56 as shown in FIGS. 6 and 7. The modification in FIG. 8 also includes a hose end contacting surface 90 which corresponds to the surface 66 of the embodiment shown in FIGS. 6 and 7. Other than the support of spacer 82 by the breakaway tab portion 84 and the absence of a slot ant T-shaped support, the embodiment shown in FIG. 8 is similar and operates essentially in the same manner as previously described. Although the nipple shaped fitting 12, tank 14 and snap ring 58 have not been illustrated in FIG. 8, the modified housing 68 and spacer 82 require these components to complete the connector assembly.

Although only two preferred embodiments have been described in detail, other modifications are contemplated which would fall within the scope of the following Claims.

I claim:

1. A hose connector in the form of a composite assembly to facilitate connecting a bare hose end to a fitting solely by insertion of the hose therein, comprising:

a hose receiving nipple shaped member having an elongated main body portion, the member also having a first end with an enlarged bead portion for first receiving the hose end thereover and for producing limited radially outward expansion of the hose adjacent the bead, the member being axially apertured to form a passage therethrough for transmitting fluid from and to the hose;

a hollow housing encircling the nipple shaped member and defining a generally cylindrically configured interior and with an open end radially spaced from the bead portion to permit insertion of the hose end over and along the nipple shaped member, the housing being supported about the nipple shaped member at an opposite end;

a radially expandable snap ring within the housing having a generally circular shape and an inner diameter relative to the outer diameter of the hose when in a non-expanded configuration so as to exert an inwardly radially constrictive force on the hose, the ring having a radially directed separation forming facing end surfaces which are movable apart in the circumferential direction of the snap ring against the ring's elasticity to a stressed configuration characterized by an enlarged and slightly elliptical inner opening of sufficient dimension relative to the outer hose surface to facilitate insertion of the hose therethrough while sliding over the main body portion of the nipple shaped member;

a snap ring spacer member supported by the housing and including a portion within the interior of the housing defining a pair of oppositely facing spacing surfaces which are separated sufficiently to maintain the end surfaces of the snap ring apart and, thus, in the stressed configuration with the end surfaces of the snap ring bearing respectively on the end spacing surfaces of the spacing member prior to completion of the hose connection;

the spacer member further including an inwardly extending portion for contact by the hose end to produce axial movement of the spacer member in the housing as the hose is fully inserted over and along the main body of the nipple shaped member;

means on the housing member to block axial movement of the snap ring corresponding to the aforesaid axial movements of the spacer member by insertion of the hose end whereby full insertion of the hose end causes disengagement between the spacer's spacing surfaces and the end surfaces of the snap ring to permit radial contraction of the snap ring about the hose.

2. A hose connector in the form of a composite assembly to facilitate connecting a base hose end to a fitting solely by insertion of the hose therein, comprising:

a hose receiving nipple shaped member having an elongated main body portion, the member also having a first end with an enlarged bead portion for first receiving the hose end thereover and for producing limited radially outward expansion of the hose adjacent the bead, the member having axially extending aperture means for providing a fluid passage therethrough to transmit fluid to and from the hose;

a hollow housing encircling the nipple shaped member and defining a generally cylindrically configured interior and with an open end radially spaced outward from the bead portion to permit insertion of the hose end over and along the nipple shaped member, the housing being supported about the nipple shaped member at an opposite end;

a radially expandable snap ring within the housing having a generally circular shape and an inner diameter relative to the outer diameter of the hose and when in a non-expanded configuration so as to exert an inwardly radially constrictive force on the hose, the ring having a radially directed separation forming facing end surfaces which are movable apart in a circumferential direction of the snap ring against the ring's elasticity to a stressed configuration characterized by an enlarged and slightly elliptical shape with an inner opening of sufficient dimension relative to the outer hose surface to facilitate insertion of the hose therethrough while sliding over the body of the nipple shaped member;

a snap ring spacer member supported by the housing and including a portion within the interior of the housing defining a pair of oppositely facing spacing surfaces which are separated sufficiently to maintain the end surfaces of the snap ring apart and thus in the stressed configuration with the end surfaces of the snap ring bearing respectively on the end spacing surfaces before full insertion of the hose into the connector;

the spacer member further including an inwardly extending portion for contact by the hose end to produce axial movement of the spacer member in the housing as the hose is fully inserted over and along the main body portion of the nipple shaped member, means including a slot in the housing and a radially outwardly extending portion of the spacer member which extends into the slot for guiding and axially directing movements of the spacer member relative to the housing;

housing means including radially inwardly extending blocking portions to limit axial movement of the snap ring while permitting corresponding axial movements of the spacer member caused by the insertion of the hose end whereby full axial insertion of the hose end over the nipple shaped member disengages the end surfaces and the spacing surfaces of the snap ring and the spacer member respectively permitting the snap ring to radially contract about the hose and the main body portion to a contracted gripping configuration preventing opposite disengaging movement of the hose produced by interference with the enlarged bead thereof.

3. A hose connector in the form of a composite assembly to facilitate connecting a bare hose end to a fitting solely by insertion of the hose therein, comprising:

a hose receiving nipple shaped member having an elongated main body portion, the member also having a first end with an enlarged bead portion for first receiving the hose end thereover and for producing limited radially outward expansion of the hose adjacent the enlarged bead, the member having axially extending aperture means for providing a fluid passage therethrough to transmit fluid to and from the hose;

a hollow housing encircling the nipple shaped member and defining a generally cylindrically configured interior with an open end radially spaced outward from the bead portion to permit insertion of the hose end over and along the nipple shaped member, the housing being supported about the nipple shaped member at an opposite end;

a radially expandable snap ring within the housing having a generally circular annular shape and an inner diameter relative to the outer diameter of the hose when in a non-expanded configuration so as to exert an inwardly radially constrictive force on the hose, the ring having a radial separation forming facing end surfaces which are movable apart in a circumferential direction of the snap ring against the ring's elasticity to a stressed configuration characterized by an enlarged and slightly elliptical shape with an inner opening of sufficient dimension relative to the outer dimension of the hose to facilitate insertion of the hose end therethrough over the body of the nipple shaped member;

a snap ring spacer member supported by the housing and including a portion within the interior of the housing defining a pair of oppositely facing spacing surfaces which are separated sufficiently to maintain the end surfaces of the snap ring apart and thus in the stressed configuration with the end surfaces of the snap ring bearing respectively on the end spacing surfaces of the spacer member before full insertion of the hose fully into the connector;

the spacer member further including an inwardly extending portion adapted to contact the hose end to produce an axial force on the spacer member;

the housing and the spacer member being mold formed integrally together and supportingly connected one to another by a frangible tab means therebetween of insufficient dimension and strength to resist significant axial forces produced therebetween by contact of the spacer member and the hose end whereby full insertive movement of the hose end separates the housing and the spacer member by breaking the tab means;

housing means to limit axial movement of the snap ring while permitting axial movements of the spacer member whereby sufficient axial insertion of the hose end over the nipple shaped member disengages the end surfaces and the spacing surfaces of the snap ring and the spacing member respectively to allow the snap ring to radially contract about the hose and the main body portion to a contracted gripping configuration preventing opposite disconnecting movements of the hose by the interference with the enlarged bead thereof.

* * * * *